United States Patent
Pool et al.

(10) Patent No.: US 6,305,439 B1
(45) Date of Patent: Oct. 23, 2001

(54) VACUUM FILL/ASSEMBLY METHOD FOR FLUID DYNAMIC BEARING MOTOR

(75) Inventors: Kirby V. Pool, Soquel; David Wuester, Santa Cruz; Thaveesinn Vasavakul; Kok Chai Low, both of Scotts Valley, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/512,788

(22) Filed: Feb. 25, 2000

Related U.S. Application Data
(60) Provisional application No. 60/121,679, filed on Feb. 25, 1999.

(51) Int. Cl.$^7$ .................. B65B 31/00; B67C 3/00
(52) U.S. Cl. .............. 141/4; 141/5; 141/7; 141/51; 141/59; 141/65; 141/82
(58) Field of Search .................. 141/4, 5, 7, 8, 141/51, 59, 65, 82; 277/80, 135; 184/29, 6.22, 55.1, 55.2, 57; 384/100, 107

(56) References Cited

U.S. PATENT DOCUMENTS

| | | | |
|---|---|---|---|
| 3,870,382 | 3/1975 | Reinhoudt | 308/9 |
| 4,061,163 | 12/1977 | Decker et al. | 141/7 |
| 4,753,276 | 6/1988 | Inaba et al. | 141/7 |
| 4,928,376 | 5/1990 | Poglitsch | 29/530 |
| 5,067,528 | 11/1991 | Titcomb et al. | 141/4 |
| 5,323,818 | 6/1994 | Yakubowski | 141/7 |
| 5,524,728 | 6/1996 | Williams et al. | 184/29 |
| 5,559,382 | 9/1996 | Oku et al. | 310/90 |
| 5,575,355 | 11/1996 | Williams et al. | 184/55.1 |
| 5,577,842 | 11/1996 | Parsoneault et al. | 384/114 |
| 5,601,125 | * 2/1997 | Parsoneault et al. | 141/51 |
| 5,653,540 | 8/1997 | Heine et al. | 384/123 |
| 5,666,716 | 9/1997 | Parsoneault et al. | 29/596 |
| 5,678,929 | 10/1997 | Parsoneault et al. | 384/112 |
| 5,778,948 | 7/1998 | Gomyo et al. | 141/7 |
| 5,795,074 | 8/1998 | Rahman et al. | 384/123 |
| 5,862,841 | 1/1999 | Wuester, Sr. | 141/284 |
| 5,894,868 | * 4/1999 | Wuester, Sr. | 141/4 |

* cited by examiner

*Primary Examiner*—Timothy L. Maust
(74) *Attorney, Agent, or Firm*—Thomason, Moser & Patterson, LLP

(57) ABSTRACT

A single step shaft assembly and oil fill process begins with the sleeve and thrust plate being assembled, leaving open the entire shaft cavity. The assembly is then placed in an evacuation chamber, and air is evacuated. A measured amount of oil or hydrofluid is then placed in the shaft cavity. The shaft is then inserted in the shaft cavity and pressed or otherwise inserted into an opening in the thrust plate. When this is done, the oil will disperse throughout the bearing fluid gap and cavity. When properly measured, no oil will exit the cavity.

9 Claims, 4 Drawing Sheets

VACUUM FILL/ASSEMBLY METHOD FOR FLUID DYNAMIC BEARING MOTOR

CROSS-REFERENCE TO A RELATED APPLICATION

This application claims priority to provisional application, Serial No. 60/121,679 filed Feb. 25, 1999 and assigned to the assignee of this application; the priority of this provisional application is hereby claimed.

FIELD OF THE INVENTION

The present invention relates to the field of hydrodynamic bearings and especially to assembly methods for such bearings.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor which is generally located inside the hub or below the discs. One type of motor in common use is known as an in-hub or in-spindle motor. Such in-spindle motors typically have a spindle mounted by means of a bearing system to a motor-shaft disposed in the center of the hub. In many well-established designs, two ball bearings are used. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally guarantee physical contact between raceway and ball, in spite of the lubrication layer provided by the bearing oil or grease. Hence, bearing balls running on the generally smooth but microscopically uneven and rough raceways, transmit this surface structure as well as their imperfection in sphericity in the form of vibration to the rotating disc. This vibration results in misalignment between the data tracks and the read/write transducer, limiting the data track density and the overall performance of the disc drive system.

Another problem is related to the application of hard disc drives in portable computer equipment and resulting requirements in shock resistance. Shocks create relative acceleration between the discs and the drive casting which in turn show up as a force across the bearing system. Since the contact surfaces in ball bearings are very small, the resulting contact pressures may exceed the yield strength of the bearing material, and cause long term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing.

In these types of systems, lubricating fluid—either gas or liquid—functions as the actual bearing surface between the rotating spindle or rotating hub of the motor. For example, liquid lubricants comprising oil, more complex ferro-magnetic fluids or even air have been utilized in hydrodynamic bearing systems. The reason for the popularity of the use of air is the importance of avoiding the outgassing of contaminants into the sealed area of the head/disc housing. However, air does not provide the lubricating qualities of oil. The relatively high viscosity of oil allows for larger bearing gaps and therefore greater tolerances to achieve similar dynamic performance.

The lubricating fluid itself must be very accurately filled in the bearing. If the bearing is loaded with too much fluid, the fluid will inevitably escape into the surrounding atmosphere landing on the surface of the disc and inevitably degrade the performance of the disc drive. If too little fluid is loaded, then the physical surfaces of the spindle and housing will probably contact one another, leading to increased wear and eventual failure of the bearing system.

The current oil fill method for most hydrodynamic or fluid dynamic motors requires a complex and costly oil fill machine that requires a significant amount of skill and effort to maintain. It requires that a high level of vacuum be drawn on an assembled frame/sleeve with installed shaft. Because of the very tight clearances and sharp comers required for a fluid bearing, it has proven difficult to consistently evacuate all traces of air from the bearing before it is filled. The consequences of this are bubbles in the bearing that could lead to a shortened bearing life.

In addition to the complexities of reliably filling the motor (resulting in high process control costs) the current method leaves a considerable amount of excess oil on the surfaces of the sleeve which must subsequently be removed through an arduous post-cleaning process. This process frequently amounts to nearly one-third of the total assembly cost of the motor. Therefore, a more reliable assembly process which results in more accurate filling of the motor and less cleaning time is needed.

SUMMARY OF THE INVENTION

The present invention overcomes many of the problems of the prior art, especially with the problems of proper evacuation of the cavity where the hydrodynamic bearing is to be formed and distribution of the fluid, which forms the bearing surface of the hydrodynamic bearing. By adopting a single step shaft assembly and oil fill process, many of the above negative influences are eliminated.

According to the inventive process, the sleeve and thrust plate are assembled, leaving open the entire shaft cavity. The assembly is then placed in an evacuation chamber, and air is evacuated. A measured amount of oil or hydrofluid is then placed in the shaft cavity. The shaft is then inserted in the shaft cavity and pressed against or otherwise inserted into an opening in the thrust plate. When this is done, the oil will disperse throughout the bearing fluid gap and cavity. When properly measured, no oil will exit the cavity. Thus, by following this process, no post-cleaning will be needed. The problem with the tight clearances in establishing a reliable fill of the gap with fluid will be overcome. Further, assembling the shaft into a thrust plate which was already captured in the cavity defined by the sleeve and counterplate eliminates the need for a precision press and run-out measurement operation to merge the shaft and thrust plate before assembly into the motor. This will lead to further substantial savings in capital, equipment and labor.

Other features and advantages of the present invention will become apparent to a person of skill in the art who studies the disclosure given in conjunction with the following figures.

DETAILED DESCRIPTION OF A PREFERRED EMBODIMENT

The description to follow of a preferred embodiment of the present invention teaches a highly efficient vacuum fill technique combined with a novel and efficient shaft and thrust plate assembly method. The fill technique is useful for inserting lubricating fluid into a fluid dynamic bearing which maybe incorporated in a typical environment into a spindle motor for a hard disc drive. The technique and assembly method for assembling the shaft with the thrust plate are useful in any hydrodynamic bearing. Hydrodynamic bearings have many uses other than in hard disc drives and the invention is not intended to be limited to use in such an environment.

However, it is especially useful in hydrodynamic bearings for hard disc drives because of the importance of not having any residual fluid leak out of the motor or expelled from the bearing over the life of the bearing, as such would contaminate the atmosphere within the hard disc drives where droplets are outcasting. It is always a major concern in the design of a hydrodynamic hard disc drive spindle motor to ensure that the lubricant or fluid is confined to a region where it lubricates the rotating surfaces, and cannot migrate to the regions where the data storing discs are located. Therefore prior art fill methods incorporate an expensive and intensive clone step. The present process eliminates the need for that step.

Figure 1A:
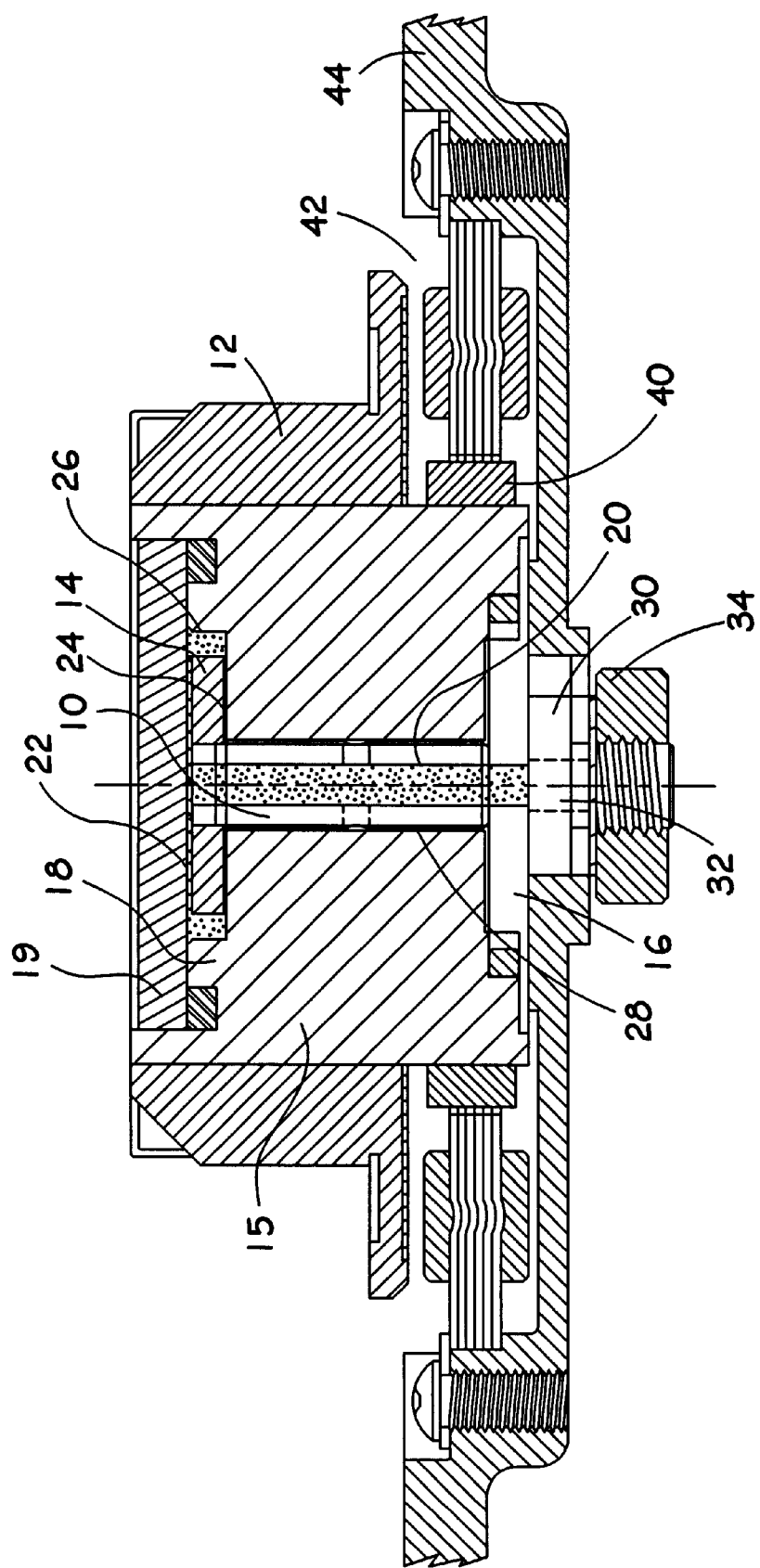
FIG. 1A is a vertical sectional view of a known spindle motor incorporating a shaft and thrust plate.

The basic principals of the invention will be explained with respect to a hydrodynamic bearing utilized in a spindle motor whose basic outline appears in FIG. 1A. The basic structure of the motor, or at least as much as is relevant to this invention, includes a stationary shaft 10 and a hub 12 supported on a sleeve 15 which rotates around the shaft. The shaft includes a thrust plate 14 at one end and ends in a shoulder 16 at the opposite end. The sleeve 15 also supports a counterplate 19. One of the two opposing surfaces of the shaft/thrust plate assembly and the sleeve/counterplate assembly typically carries cylindrical sections of spiral grooves as is well-known in this technology. The fluid, which supports the shaft and sleeve for relative rotation, surrounds all of the exposed surfaces of the thrust plate filling the gaps 22, 24, 26, as well as the region 28 between the outer surface of the shaft 10 and the inner surface of the sleeve 15. In FIG. 1A, in the bearing shown therein, the fluid is supplied to the lubricated surfaces from reservoir 20 which runs through the center of the shaft 10. The lubricated surfaces include both the top and sides of the thrust plate and the outside diameter 26 of the thrust plate and the outsides of the circular shaft and inner surface of the sleeve. The use of the reservoir as a fluid supply is not significant to this invention. The invention is equally appropriate for use with a design or in the shaft as a solid piece. The same problem is presented in both instances, of adequately providing a sufficient supply of fluid to all of the surfaces, which must be lubricated, and do so without allowing any air bubbles to exist.

In FIG. 1A, the magnet 40 and stator 42 as well as base element 44 are shown in place. However, the process to be described below may be more easily executed if all of these parts have not yet been added to the assembly.

Figure 1B:
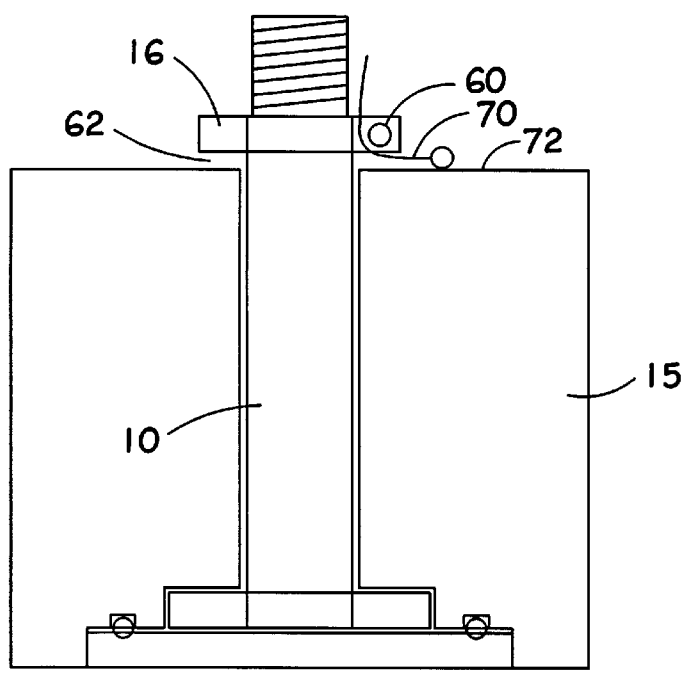
FIG. 1B is a schematic diagram of the filling scheme of the prior art.
Figure 2:
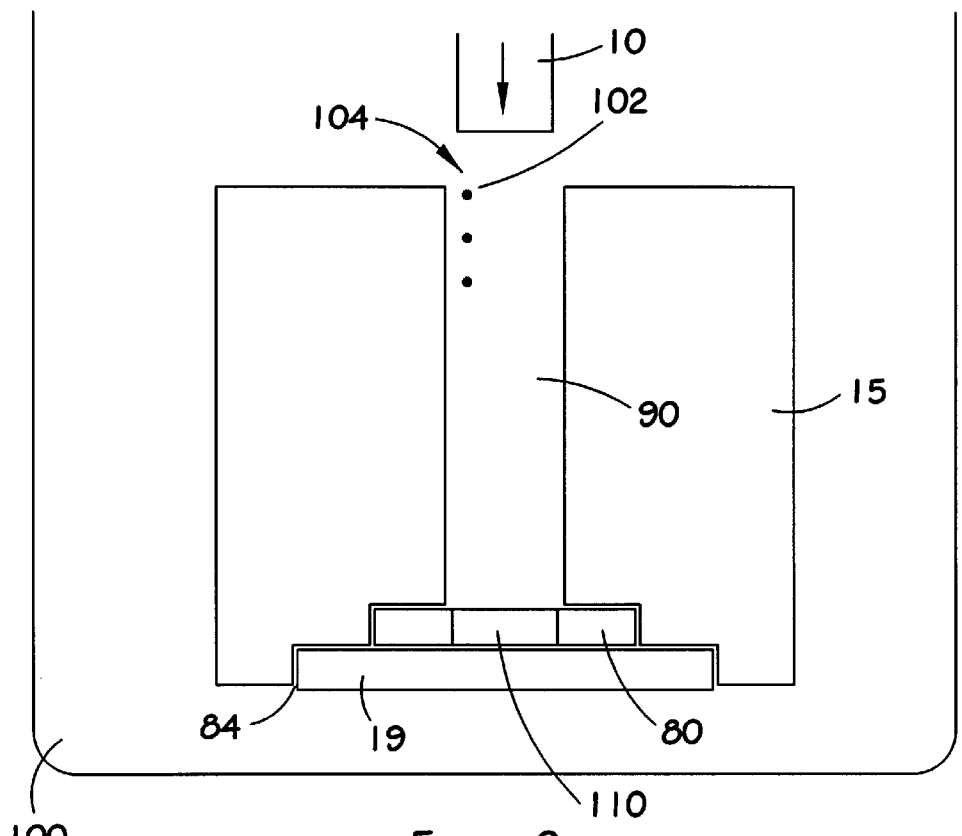
FIG. 2 is a vertical sectional view of the assembly method and product of the present invention.

Referring to FIG. 1B, a bearing assembly is shown in which the shaft 10 and thrust plate 11 were assembled, dropped into a sleeve 15 and counterplate 17 was pressed in place. In a process as executed in the prior art, an O-ring usually indicated at seal 60 is now used to seal the opening 62 between the end of the sleeve 15 and the shoulder 16. The region surrounding this sealing ring 60 and all of the fluid bearing gap of the hydrodynamic bearing is then evacuated of air, and fluid is inserted by a needle or the like 70 into the gap. However, it is immediately apparent that it would be difficult to achieve a consistent high level of vacuum on the assembled frame sleeve and shaft assembly. Because of the very tight clearances and sharp corners required for a fluid bearing, it is difficult to consistently evacuate all traces of air from the bearing before it is filled. The consequences of this is bubbles in the bearing fluid that could lead to a shortened bearing life. Moreover, it is also apparent that it would be difficult to get fluid into the sharp corners formed between the hub and the thrust plate. Finally, excess oil could immediately appear on the bottom surface 72 of the hub 15, requiring an arduous and time-consuming post-cleaning process. For this reason, the process of FIG. 2 has been adopted. According to this process, the sleeve 15 and counterplate 19 are assembled as shown. However, prior to this assembly, the thrust plate 80 is located in the stepped region of the sleeve so that when the counterplate 19 is put in place, and preferably held in place by welds 84, the thrust plate is effectively held in place by the fact that the gaps between the shaft 15, counterplate 19, and thrust plate 80 are very small, being measured in microns. The region 90 where the shaft is to be located is left open. The assembly comprising sleeve 15, counterplate 19, and thrust plate 80 is now placed in a vacuum chamber 100 to evacuate all of the air from the shaft opening 90 and the gaps surrounding the thrust plate 80. This is achieved using normal evacuation techniques which need not be further discussed in this patent. A measured amount of oil represented by drops 102 is then placed in the shaft opening 90 as indicated by the arrow 104. This oil will naturally tend to fall to the bottom and coat the surfaces of the thrust plate. The shaft 10 is then inserted into the shaft opening 90. Because the shaft fills almost all of the remaining space, and the amount of oil inserted has been carefully measured, the oil is forced by pressure and capillary action to fill what is now the fluid bearing gap between the sleeve 15 and the shaft 10. Moreover, the shaft can now be physically inserted into the opening 110 in the thrust plate 90 and fixed in place forming an integrated single piece assembly.

It is apparent that dispensing a known amount of fluid 102 into the shaft opening 90 prior to the insertion of the shaft eliminates excess oil and the need for post-cleaning. Further, the step of combining the captured thrust plate and shaft eliminates the need for a precision press and run-out measurement operation to merge the shaft and thrust plate before assembly into a fluid bearing or motor. Therefore, this method provides substantial benefits over known prior art approaches.

Figure 3A:
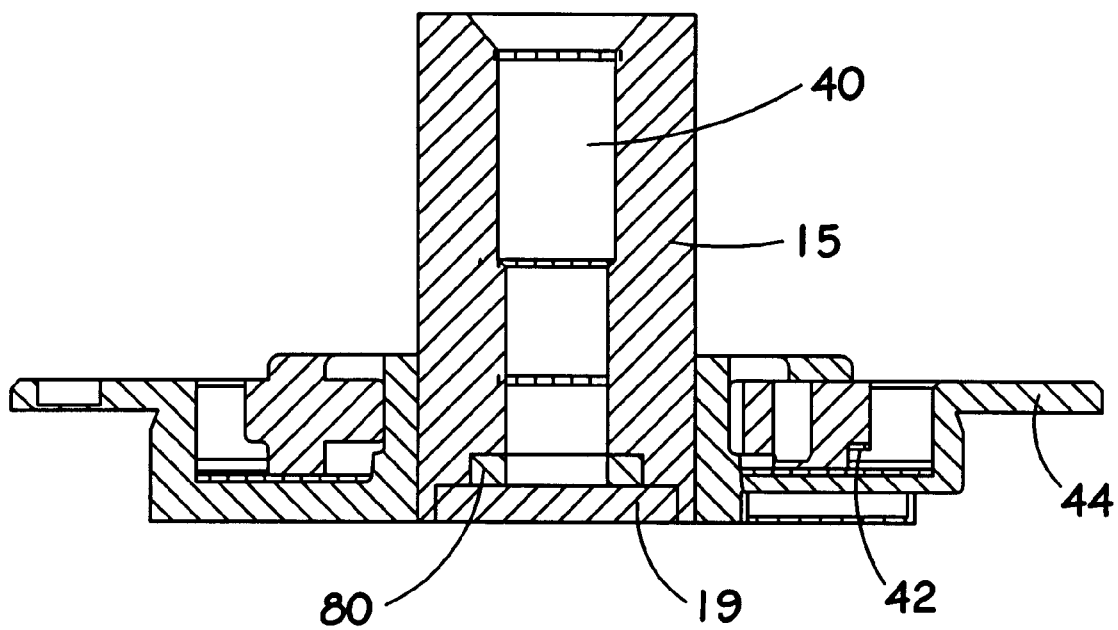
FIGS. 3A–3C show the inventive process applied to a complete motor assembly with a rotating shaft.
Figure 3B:
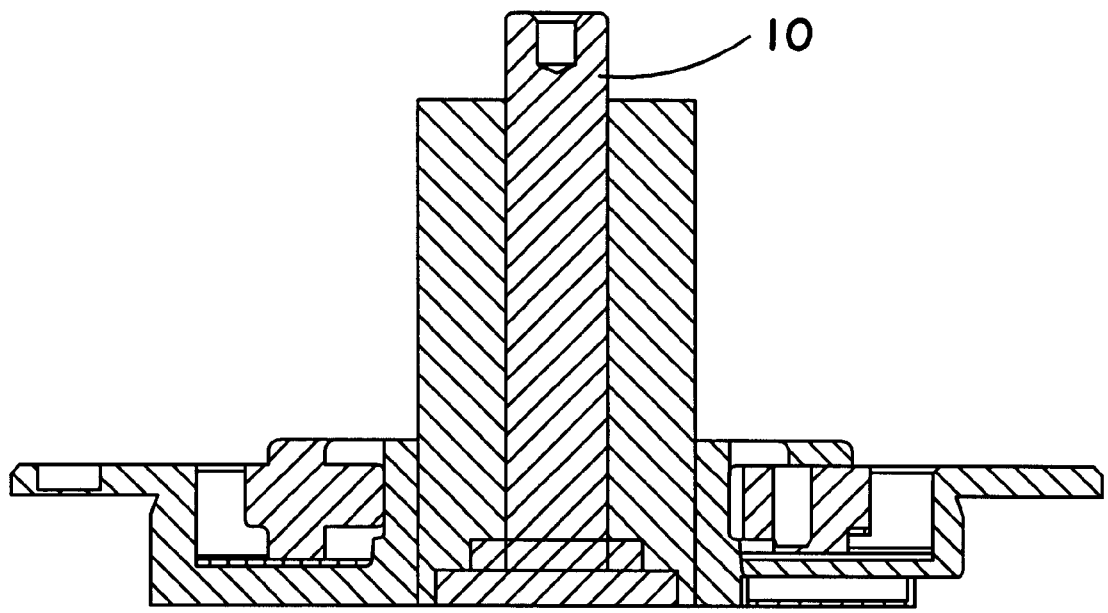
Figure 3C:
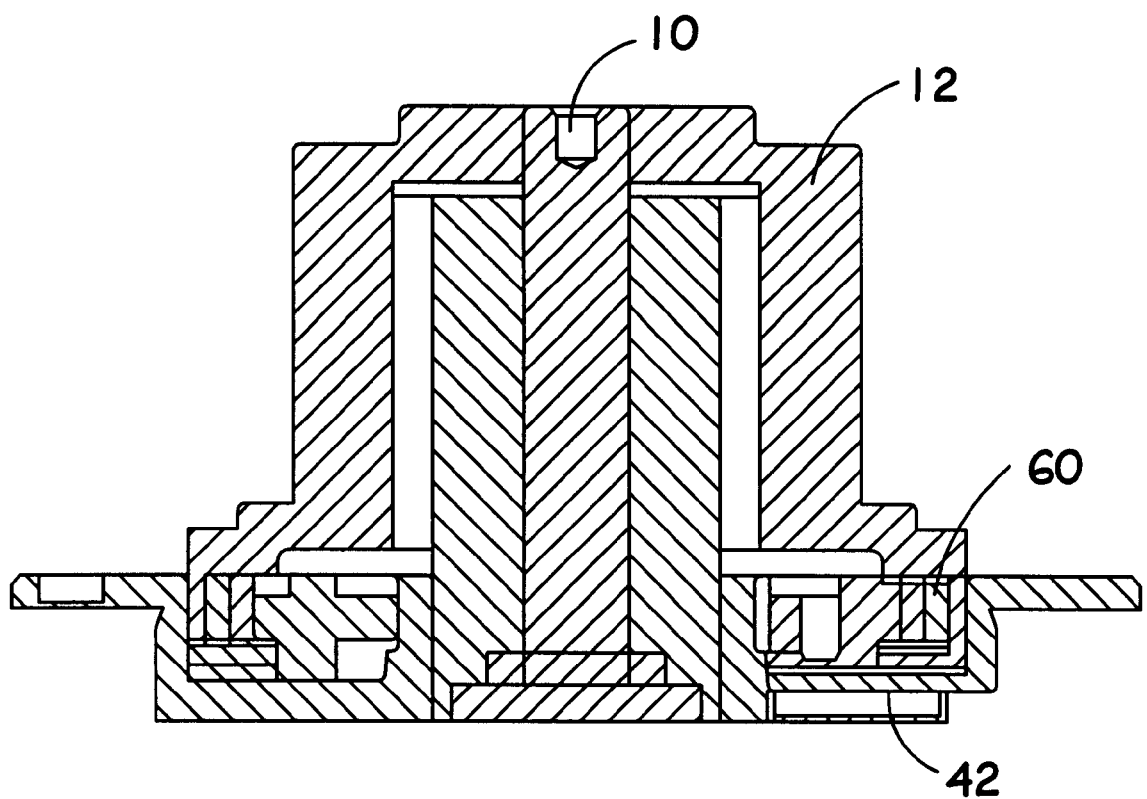

It is further apparent that the assembly of a complete motor could be achieved using the same process as shown in FIGS. 3A–3C. In such a process, the counterplate 19 is welded to the sleeve 15 as shown in FIG. 3A with the thrust plate 80 held in the cavity defined by these two pieces. The base element 44, which supports the stator 42 is also secured to the sleeve 15. After a measured amount of fluid is inserted in the cavity 90, then as shown in FIG. 3B, the shaft 10 is inserted and pressed into or fastened into the thrust plate 80. After this step, as shown in FIG. 3C, the hub 12 is fastened to the end of the sleeve 10 so that it can rotate together. The hub carries the magnet 60 into place adjacent the stator 42 so that a complete motor supported from the frame 44 is now assembled and ready for use.

It should further be apparent to someone who reads the disclosure that specific pressures and the like for executing this process are known to those of skill in the art in this field and need not be discussed in detail herein.

Other features and advantages of this invention will be apparent to a person of skill in the art who studies this invention disclosure. Therefore, the scope of the present invention is to be limited only by the following claims.

What is claimed is:

1. A method for assembling a fluid dynamic bearing including assembling a sleeve defining a first step for a counterplate and a second step for a thrust plate by first inserting the thrust plate in the region defined by the second step and then inserting the counterplate in the region defined by the first step, fixing the counterplate firmly in place, applying a vacuum to the hydrodynamic bearing region of the above assembly, and inserting a measured amount of oil into an opening in said sleeve for a shaft prior to inserting the shaft, and pressing said shaft through said opening to said thrust plate to distribute the oil in the openings between the shaft and the surrounding sleeve and the thrust plate and the surrounding sleeve and counterplate.

2. A method as claimed in claim 1 comprising the step of welding the counterplate to an inner edge of the first step of said sleeve to fix the counterplate firmly in place so that said shaft may press said thrust plate against the counterplate to combine said shaft and thrust plate.

3. A method as claimed in claim 2 further comprising inserting a measured amount of oil into an opening in said sleeve for a shaft prior to inserting the shaft, and pressing said shaft through said opening to said thrust plate to distribute the oil in the openings between the shaft and the surrounding sleeve and the thrust plate and the surrounding sleeve and counterplate.

4. A method for filling a fluid dynamic bearing with fluid comprising the step of assembling together with a sleeve comprising a first step for supporting a counterplate in place and a second step for defining a region for a thrust plate with said thrust plate and with said counterplate to form a single integrated assembly surrounding a thrust plate located in a region defined by the first step, applying a vacuum to the integrated assembly, inserting a measured amount of oil into an opening defined for inset sleeve for said shaft, inserting the shaft in said shaft opening thereby distributing the fluid over throughout the gap between the sleeve and the shaft, and withdrawing the vacuum from around the sleeve and shaft assembly.

5. A method as claimed in claim 4 including the step of welding the counterplate to the sleeve to fix the counterplate against the sleeve and hold the thrust plate firmly in the position defined by the second step of the sleeve.

6. A method as claimed in claim 5 including the step of press-fitting the shaft into the thrust plate to form a unitary assembly of such shaft and thrust plate.

7. A method of assembling a spindle motor for use in a disc drive comprising the step of assembling a base for supporting a stator of the spindle motor together with a sleeve comprising a first step for supporting a counterplate in place and a second step for defining a region for a thrust plate with said thrust plate and with said counterplate to form a single integrated assembly surrounding a thrust plate located in a region defined by the first step, applying a vacuum to the integrated assembly, inserting a measured amount of oil into an opening defined for inset sleeve for said shaft, inserting the shaft in said shaft opening thereby distributing the fluid over throughout the gap between the sleeve and the shaft, and withdrawing the vacuum from around the sleeve and shaft assembly.

8. A method as claimed in claim 7 including the further step of affixing a hub to an end of the shaft distal from the thrust plate.

9. A method as claimed in claim 8 comprising the step of welding the counterplate to an inner edge of the first step of said sleeve to fix the counterplate firmly in place so that said shaft may press said thrust plate against the counterplate to combine said shaft and thrust plate.

* * * * *